United States Patent [19]

Hancock

[11] Patent Number: 4,887,852
[45] Date of Patent: Dec. 19, 1989

[54] PIPE CONNECTOR

[75] Inventor: Arnold H. Hancock, Woodville North, Australia

[73] Assignee: Aquacorp Limited, Australia

[21] Appl. No.: 287,122

[22] Filed: Dec. 20, 1988

[30] Foreign Application Priority Data

Dec. 21, 1987 [AU] Australia ............................. PI6003

[51] Int. Cl.[4] ............................................. F16L 55/00
[52] U.S. Cl. .................................... 285/175; 285/177; 285/354; 285/423; 285/906
[58] Field of Search ............... 285/354, 423, 226, 175, 285/177, 906

[56] References Cited

U.S. PATENT DOCUMENTS

| 168,970 | 10/1875 | Caswell | 285/354 X |
| 2,026,954 | 1/1936 | Van Dusen | 285/334.2 X |
| 3,600,009 | 8/1971 | Shupper | 285/226 |
| 4,165,110 | 8/1979 | Itzler | 285/423 X |
| 4,484,770 | 11/1984 | Sloane | 285/354 X |

Primary Examiner—Dave W. Arola
Attorney, Agent, or Firm—Brown, Martin, Haller & McClain

[57] ABSTRACT

An improved flexible pipe connector for interconnecting in sealing relationship two pipe or tube sections comprising a deformable resilient hollow connector portion having a first tubular end portion sealingly engageable with an end of a first pipe or tube section, a second tubular end portion connectable to a second pipe or tube section and an intermediate portion having a plurality of annular strengthening ribs, a short length rigid reinforcing collar surrounding the first end portion and a coupling slip nut slidably located on the collar for both rotational and axial movement relative thereto, the slip nut being adapted for connection to the end of a first pipe or tube section.

11 Claims, 2 Drawing Sheets

PIPE CONNECTOR

This invention relates to an improved pipe connector for interconnecting in sealing relationship two pipe or tube sections, and in particular for interconnecting a pair of misaligned pipe sections.

Many different forms of pipe connectors are known to the applicant. Difficulties are often encountered by plumbers when connecting respective ends of misaligned pipe sections to a connector fitting, particularly in situations where there is very little room within which to carry out the necessary plumbing work.

It is the main object of the present invention to provide an improved pipe connector which obviates the aforementioned problem and allows the interconnection of misaligned pipe sections in cramped plumbing areas to be quickly and readily carried out.

It is a further object of the present invention to provide an improved pipe connector which is of extremely simple design and inexpensive to manufacture.

According to one form of this invention therefore, improved coupling means for interconnecting in sealing relationship two pipe or tube sections, comprises a deformable and flexible hollow tubular connector formed of polymeric material and having a first tubular end portion arranged for sealing engagement with an end of a first pipe or tube section, a second tubular end portion adapted for connection to a second pipe or tube section, and an intermediate portion having a plurality of annular strengthening ribs, a short length reinforcing collar or sleeve formed of relatively rigid material, preferably plastic, surrounding said first end portion and in contiguous relationship therewith, the outer cylindrical surface of said collar or sleeve being smooth, and a coupling slip nut slidably located on said collar or sleeve for both rotational and axial movement relative thereto, said slip nut being adapted for connection to the end of a said first pipe or tube section.

The rigid collar or sleeve supports the first end portion of the connector from blowing out under pressure, but also provides a smooth hard surface for the slip nut to rotate when threadably engaging same with an end of a pipe to be connected thereto. The strengthening ribs formed on the intermediate portion of the connector serve to increase the burst pressure capability of the pipe connector.

In another form of this invention, the reinforcing collar or sleeve is located internally of the first tubular end portion (rather than externally thereof) and is sufficiently rigid to support the wall of the first end portion in an undistorted state under either pressure or vacuum conditions to thereby allow the slip nut to slide freely therealong and be rotated relative thereto. The collar or sleeve may be moulded or bonded after assembly to the connector and formed of rigid ABS plastics material.

Preferably, the second end portion is formed as a spigot end which engages in a socket end of a pipe to be connected. Normally the spigot/socket portions are solvent welded together. In some cases the connector may be provided with slip nuts at both end portions for rejoining the ends of a pipe from which a section has been cut when carrying out maintenance plumbing work.

Preferably, the first end portion of the connector terminates in a radially out-turned flange having a smooth annular radial surface which constitutes a sealing face for sealing engagement against an end surface of the pipe end coupled to the slip nut. To avoid the buckling of the sealing face (upon tightening of the nut), the externally located rigid collar or sleeve terminates at its outer end in a radially out-turned flange which makes face to face contact with the inner radial surface of the out-turned flange on the connector.

In the case where the collar or sleeve is located internally, a rigid annular washer, e.g. of plastics material, is interposed between the connector out-turned flange and the end wall of the slip nut.

Preferably the slip nut and sleeve are arranged so that the nut can slide axially inwardly along the connector by a distance approximately equal to the full depth of the internal thread of the nut, whereby, when so positioned, the sealing face stands slightly proud of the outer end face of the slip nut. This arrangement allows sideways movement of the pipe or tube section relative to the coupling nut and permits the pipe end and nut to be more easily aligned during installation.

In order to more fully explain the present invention, several embodiments are described hereunder in some further detail with reference to the accompanying drawings wherein.

Figure 1:
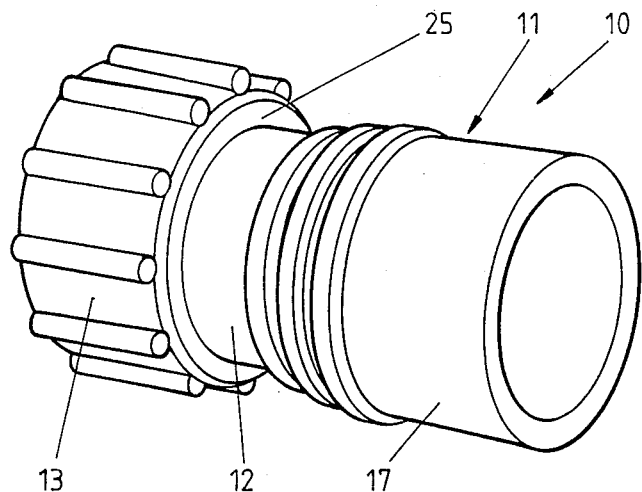
FIG. 1 is a perspective view of a flexible pipe connector according to one embodiment of this invention.
Figure 2:
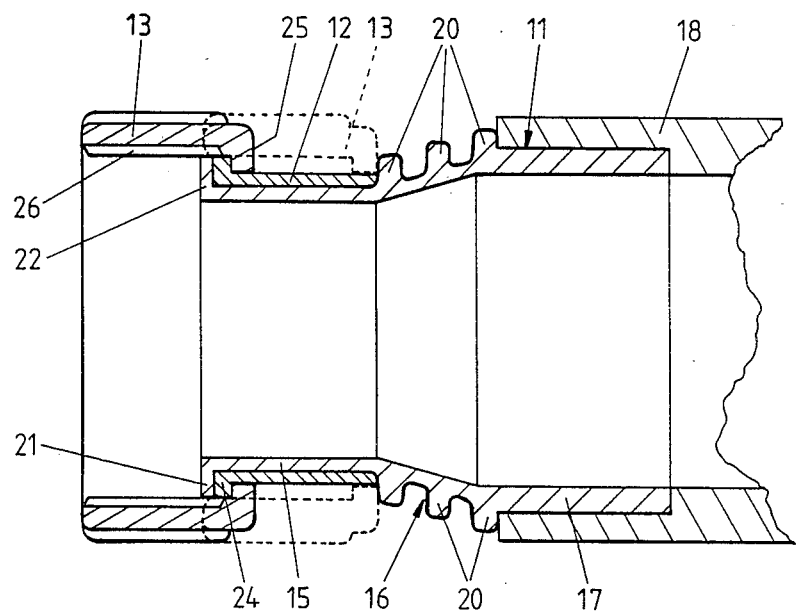
FIG. 2 is a longitudinal section taken through the connector of FIG. 1.

In the embodiment shown in FIGS. 1 and 2, a pipe connector 10 comprises a short length open-ended connector tube 11 which is moulded of flexible, resilient soft durometer PVC, an hollow cylindrical collar or sleeve 12 surrounding one end portion of the connector tube 11 and being moulded of rigid plastics material, e.g. ABS plastic, and a coupling slip nut 13 encircling the sleeve or collar 12 and supported for both rotational and axial sliding movement with respect thereto.

The flexible connector tube 11 is formed to have a first end tubular portion 15 which merges with an intermediate conical portion 16 which in turn merges with a second end tubular portion 17 which, in this embodiment, has an internal diameter slightly greater than the internal diameter of the first end portion 15. The end portion 17 constitutes a spigot which is arranged to be connected to one end of a pipe 18 (or a pipe fitting) in a spigot/socket manner and solvent welded together by means of a suitable PVC solvent cement. The intermediate portion 16 is provided with a plurality of axially spaced circumferential ribs 20 which serve to strengthen the burst pressure capability of the connector 10. The first end portion 15 terminates at its outer end in a flexible, resilient, radially out-turned flange 21 which provides an annular, radial sealing face 22 (which serves as a washer) and is arranged to sealably engage against the end surface of a pipe/pipe fitting (not shown) upon tightening of the slip nut 13. This arrangement thus provides a leak-tight seal at the slip nut end of the connector without the need to use a separate sealing member such as an O-ring.

The rigid sleeve or collar 12 is also formed with a radially out-turned annular flange 24 which abuts against the inner radial face of the flexible out-turned flange 21 and provides support therefor. This reduces the likelihood of the sealing face 22 "buckling" upon tightening of the nut 13. By maintaining the sealing face 22 in a flat undistorted condition, a leak-tight seal is ensured.

The slip nut 13 is provided with a central opening in its end wall 25, the diameter of the opening being slightly greater than the outer diameter of the collar 12 but less than the outer diameter of the flanges 21, 24 whereby the nut when fitted onto the connector, is unable to disengage itself therefrom. The slip nut 13 is also provided with an internal thread 26 which is arranged to threadably engage a threaded end portion of the pipe/pipe fitting which is to be attached to the connector 10 at its slip nut end. It is advantageous to have the axial length of the sleeve or collar 12 dimensioned so that the slip nut 13 is able to slide to a retracted position where the sealing face 22 approximately aligns with the outer end face of the slip nut 13. The slip nut 13, when fully untightened (shown in dotted lines in FIG. 2), is thus able to slide back the full depth of its thread 26— this is particularly advantageous in situations where plumbing is required to be carried out in cramped areas.

It will of course be appreciated that the burst pressure of the pipe connector can widely vary and depends, for example, on the nature of the materials used and dimensional considerations.

In the assembly of the connector of this invention, the slip nut 13 and the rigid collar or sleeve 12 is fitted onto the end portion 15 of the connector tube 11 by softening the end portion 15 (e.g. by heating), if necessary, so that it becomes pliable and can be readily deformed (e.g. by deforming the flange inwardly and rearwardly so as to lie in an approximately flattened state) in such a way that the collar or sleeve 12, together with the nut 13, can be readily slipped in position. In some instances, the end portion 15 may be able to be deformed sufficiently without heating.

Figure 3:
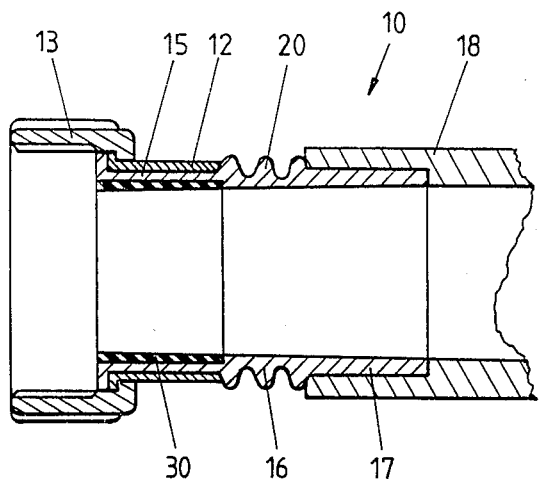
FIG. 3 is a longitudinal section taken through a flexible pipe connector according to a second embodiment.

In the embodiment shown in FIG. 3, the connector 10 is formed to have a bore of approximately constant diameter extending therethrough, the soft, flexible end portion 15 being stiffened further b the inclusion of a relatively hard internal ring support member 30 formed, e.g. of any suitable plastics material, the ring member 30 being effective to prevent collapse of the connector wall 15 when under vacuum conditions. The ring member 30 can be solvent welded to the inner surface of the wall 15 by a solvent cement, or moulded therewith.

Figure 4:
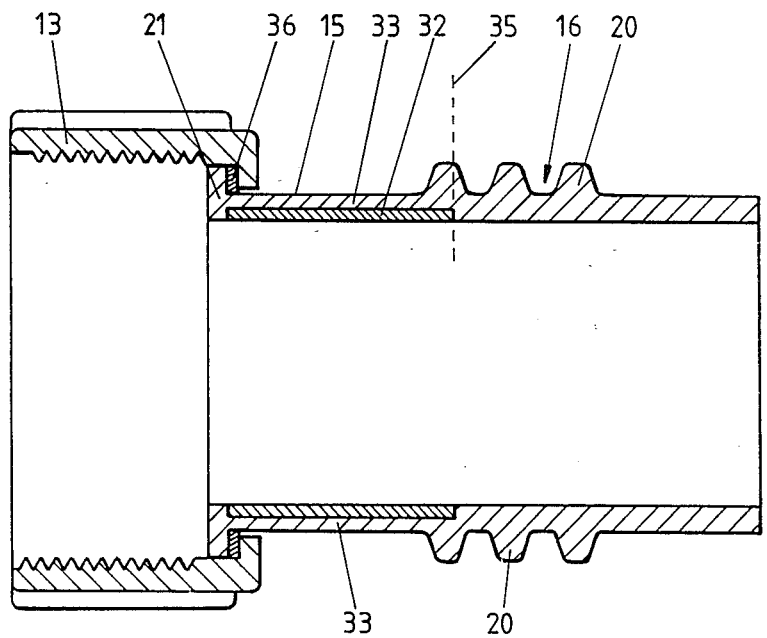
FIG. 4 is a longitudinal section taken through a flexible pipe connector according to a third embodiment of this invention.

In the embodiment shown in FIG. 4, the external collar or ring 12 is omitted and in lieu thereof a relatively rigid internal sleeve 32 is used to support the wall 33 of the end portion 15 of the connector. The support sleeve 32 is sufficiently rigid to support the wall 33 against expansion or collapse under positive pressure or vacuum conditions respectively. Preferably, the sleeve 32 extends axially into the intermediate portion 16 at least to the centre-line 35 of the first reinforcing rib 20. In addition, a hard washer 36, e.g. of nylon, is located between the end wall of the nut 13 and the relatively soft flange 21, to ensure that the nut 13 will run freely upon being tightened. The sleeve 32 maintains the walls 33 in a flat, parallel condition which allows the nut 13 to freely slide therealong.

The sleeve 32 may be secured to the bore surface of the connector 11 by moulding, e.g. by firstly placing the sleeve 32 in the die and moulding the connector 11 thereonto. Alternatively, the sleeve may be bonded in position after assembly of the connector. Preferably the sleeve 32 is formed of an ABS plastic material.

It will be appreciated that the connector can be designed with a slip nut 13 at each end thereof, so as to form a flexible barrel union which could be removed to create a gap for ease of maintenance in awkward situations, or used to rejoin the adjacent ends of a pipe which has been cut in maintenance situations.

A brief consideration of the above-described embodiment will indicate that the invention provides an extremely simple and inexpensive flexible pipe connector which is useful for joining together misaligned pipe sections (and/or pipe fittings) in situations where plumbing is carried out in cramped areas.

I claim:

1. Improved coupling means for interconnecting in sealing relationship two pipe sections, especially two longitudinally misaligned pipe sections, comprising a one-piece deformable and flexible hollow tubular connector formed of resilient plastics material and having a first tubular end portion which terminated in a radially out-turned flexible, deformable flange which forms an annular sealing end face arranged to sealingly engage against an end surface of a first pipe section, a second tubular end portion adapted for connection to a second pipe section, and an intermediate portion having a plurality of annular axially spaced, thickened portions constituting strengthening ribs for increasing the burst pressure capability of the connector;

a relatively short length reinforcing sleeve formed of relatively rigid material supported co-axially with respect to said first end portion and in contiguous fixed relationship therewith, and a coupling slip nut slidably located around said first end tubular portion and supported for both rotational and axial movement relative thereto, said slip nut having an internally threaded portion for threadably engaging a thread on the first pipe section and an inturned abutment shoulder for acting on said radially out-turned flange upon tightening of the nut so as to effect sealing engagement between the annular sealing end face and the end surface of the first pipe section.

2. Improved coupling means according to claim 1 wherein said reinforcing sleeve is located externally of the connector and surrounds said first end portion, the outer cylindrical surface of said sleeve providing a smooth hard surface for the slip nut to rotate and slide when threadably engaging same with said second pipe end, providing a smooth hard surface for the slip nut to rotate and slide when threadably engaging same with said second pipe end, said sleeve terminating at its outer end in a radially out-turned rigid flange between the radially out-turned flange and the inturned shoulder against which the inturned abutment shoulder of the slip nut engages upon tightening thereof.

3. Improved coupling means according to claim 2 wherein said radially out-turned flexible, deformable flange has an outer diameter which is substantially equal to the diameter of said rigid out-turned flange, said flexible out-turned flange having a smooth annular radial surface which constitutes said sealing end face, said out-turned flanges being in abutting face to face relationship and being clamped together upon tightening of the slip nut.

4. Improved coupling means according to claim 2, further comprising a relatively rigid internal ring support member and securing means for securing said ring support member to the inner cylindrical surface of said first end portion so as to stiffen same and inhibit its collapse under vacuum conditions.

5. Improved coupling means according to claim 1, wherein said sleeve is located internally of said connector, and further including securing means for securing the outer surface of the sleeve to the inner cylindrical surface of said first end tubular portion, said sleeve being formed of a rigid polymeric resin material.

6. Improved coupling means according to claim 5 wherein said flexible out-turned flange having a smooth annular radial surface which constitutes said sealing end face.

7. Improved coupling means according to claim 1, wherein the slip nut and reinforcing sleeve are dimensioned so that the nut can slide axially inward along the tubular end portion between an advanced position in which the inturned shoulder acts on said radially out-turned flange and a retracted position wherein the inturned shoulder is located adjacent said intermediate portion and the sealing face stands slightly proud of the outer end face of the slip nut.

8. Improved coupling means according to claim 1 wherein the second tubular end portion comprises a spigot which engages in a socket formation at the end of the second pipe section.

9. Improved coupling means according to claim 1 wherein said end portions are co-axially aligned and have internal diameters which are the same.

10. Improved coupling means according to claim 1 wherein said tubular connector is moulded of flexible, resilient, soft PVC plastics material, and said reinforcing collar or sleeve is moulded of a relatively rigid ABS plastic material.

11. Coupling means according to claim 1, wherein said end portions are co-axially aligned and have different internal diameters.

* * * * *